(12) United States Patent
Clarke et al.

(10) Patent No.: US 11,995,438 B2
(45) Date of Patent: May 28, 2024

(54) SYSTEM AND METHOD FOR SOFTWARE ARCHITECTURE REDESIGN

(71) Applicant: Dublin City University, Dublin (IE)

(72) Inventors: Paul Clarke, Dublin (IE); Andrew McCarren, Dublin (IE)

(73) Assignee: Dublin City University, Dublin (IE)

( * ) Notice: Subject to any disclaimer, the term of this patent is extended or adjusted under 35 U.S.C. 154(b) by 37 days.

(21) Appl. No.: 17/764,152

(22) PCT Filed: Sep. 30, 2020

(86) PCT No.: PCT/EP2020/077429
§ 371 (c)(1),
(2) Date: Mar. 25, 2022

(87) PCT Pub. No.: WO2021/064058
PCT Pub. Date: Apr. 8, 2021

(65) Prior Publication Data
US 2022/0413846 A1    Dec. 29, 2022

(30) Foreign Application Priority Data

Sep. 30, 2019  (GB) ..................................... 1914106

(51) Int. Cl.
*G06F 8/72*    (2018.01)
*G06F 8/20*    (2018.01)
*G06F 8/71*    (2018.01)

(52) U.S. Cl.
CPC .................. *G06F 8/72* (2013.01); *G06F 8/24* (2013.01); *G06F 8/71* (2013.01)

(58) Field of Classification Search
CPC ................................ G06F 8/25; G06F 8/71–72
See application file for complete search history.

(56) References Cited

U.S. PATENT DOCUMENTS 7,428,726 B1 *   9/2008  Cowan ................. G06F 11/368
                                                 717/121
10,552,130 B1 *  2/2020  Tene ......................... G06F 8/71
(Continued)

FOREIGN PATENT DOCUMENTS

EP          3411785 A1    12/2018
WO       2018197928 A1    11/2018

OTHER PUBLICATIONS

Kamimura et al., "Extracting Candidates of Microservices from Monolithic Application Code", published by IEEE, 2018 25th Asia-Pacific Software Engineering Conference (APSEC), pp. 571-580 (Year: 2018).*

(Continued)

*Primary Examiner* — S. Sough
*Assistant Examiner* — Zheng Wei
(74) *Attorney, Agent, or Firm* — ARC IP Law, PC; Joseph J. Mayo

(57) ABSTRACT

The present invention provides a system and method for automation of the creation of a software application as a combination of microservices by extraction of discrete elements of software functionality from a monolithic architectures using dynamic and static analysis of code and non-code-related artefacts; forming them into microservices such that the software application is recreated as serverless hardware infrastructure while also validating the transformed code. In many cases, serverless microservices will significantly reduce the hardware requirement for software systems.

27 Claims, 4 Drawing Sheets

(56) References Cited

U.S. PATENT DOCUMENTS

| | | | |
|---|---|---|---|
| 10,684,940 B1* | 6/2020 | Kayal | G06F 11/3664 |
| 10,936,291 B1* | 3/2021 | Gamliel | G06F 8/72 |
| 10,951,492 B2* | 3/2021 | Sen | H04L 41/5058 |
| 2004/0117124 A1* | 6/2004 | Kiros | G06V 20/69 |
| | | | 382/128 |
| 2005/0021715 A1* | 1/2005 | Dugatkin | H04L 41/142 |
| | | | 709/223 |
| 2009/0217185 A1* | 8/2009 | Goldfarb | G06F 8/71 |
| | | | 715/763 |
| 2019/0087179 A1* | 3/2019 | Velayudham | G06F 8/71 |
| 2019/0108067 A1 | 4/2019 | Ishikawa et al. | |
| 2019/0250912 A1 | 8/2019 | Gavisiddappa et al. | |
| 2020/0042315 A1* | 2/2020 | Gupta | G06F 8/36 |
| 2020/0195668 A1* | 6/2020 | Eshet | H04L 41/024 |
| 2020/0285451 A1* | 9/2020 | Agarwal | G06F 8/60 |
| 2020/0287977 A1* | 9/2020 | Cui | H04L 67/51 |
| 2021/0011688 A1* | 1/2021 | Sasidharan | G06F 8/10 |

OTHER PUBLICATIONS

Chen et al., "From Monolith to microservices: A Dataflow-Driven Approach", published by IEEE, 2017 24th Asia-Pacific Software Engineering Conference, pp. 466-475 (Year: 2017).*

Fan et al., "Migrating Monolithic Mobile Application to Microservice Architecture: An Experiment Report", published by IEEE, 2017 IEEE 6th International Conference on AI & Mobile Services, pp. 109-112 (Year: 2017).*

Abdullah et al., "Unsupervised learning approach for web application auto-decomposition into microservices", published by The Journal of Systems and Software, Feb. 20, 2019, pp. 243-257 (Year: 2019).*

Jin et al., "Functionality-oriented Microservice Extraction Based on Execution Trace Clustering" published by IEEE, 2018 IEEE International Conference on Web Service, pp. 211-218 (Year: 2018).*

Fritzsch et al., "From Monolith to Microservices: A Classification of Refactoring Approaches", published by Cornell University, pp. 1-13, (Year: 2019).*

International Search Report and Written Opinion issued in PCT/EP2020/077429 dated Jan. 20, 2021 (15 pages).

International Search Report and Written Opinion issued in PCT/EP2020/077429 dated Jan. 1, 2021 (10 pages).

Kazanavicius, et al., "Migrating Legacy Software to Microservices Architecture" 2019 Open Conference of Electrical, Electronic, and Information Sciences (ESTREAM), IEEE, Apr. 25, 2019 (5 pages).

* cited by examiner

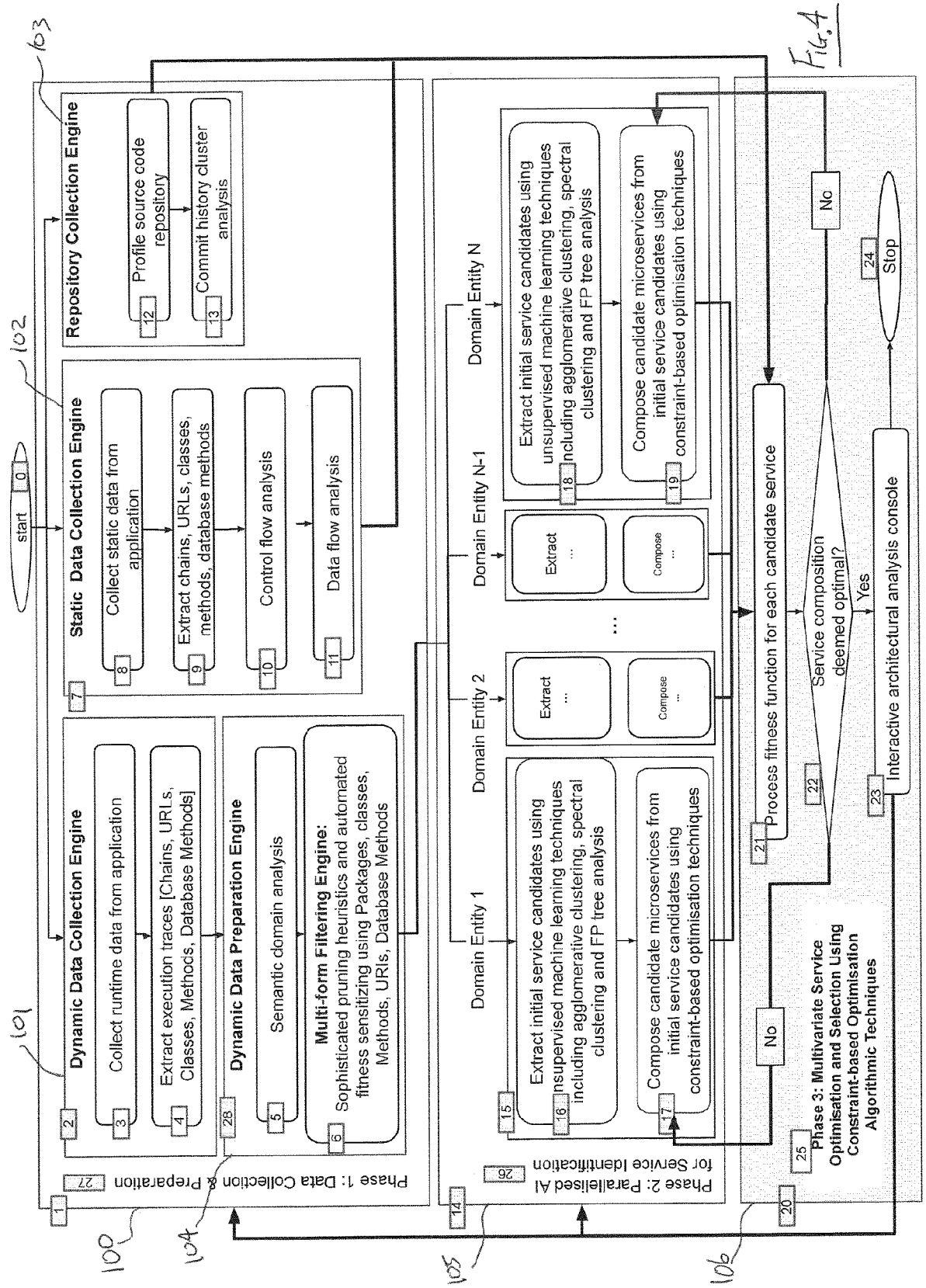

SYSTEM AND METHOD FOR SOFTWARE ARCHITECTURE REDESIGN

FIELD

The present disclosure relates to a system and method for software architecture redesign. In particular the disclosure relates to a system for software architecture redesign which replaces monolithic systems with microservices (and higher-level granularity services, e.g. individual functions in a Function as a Service environment).

BACKGROUND

There is an acceptance by many software firms of the need to modernize their software architectures so as to lower operating costs and increase speed to market. In the past, software modernization had tended to focus on a change of programming language, for example, from C/C++ to Java to take advantage of the Java Virtual Machine capability and its operational attractiveness. Such a change could be achieved, but required a level of system architectural change.

FIG. 1 is a schematic representation of a monolithic architecture 1 which comprises an application user interface (UI) 3, tightly bound business logic 5 and a database 7. As depicted in FIG. 1, the monolithic architecture 1 has all of the programmatic business logic 5 associated with a software system housed within a single large monolithic architecture. One disadvantage of this monolithic architecture is that it is unsuited to rapid feature delivery of services. Therefore, the current wave of technological advancement involves moving from monolithic software structures to cloud-based microservices.

Microservices are a software development technique (a variant of the service-oriented architecture (SOA)) that structures an application as a collection of loosely coupled services. In a microservices architecture, services are fine-grained. The benefit of decomposing an application into different smaller services is that it improves modularity. However, microservices function as service-based systems and require an entire architectural redesign. Redesign requires an elicitation of all of the intricate accumulated dependencies within the monolithic architecture, a decomposition of the core functionality into microservices and the implementation of an entirely new event-driven communications mechanism. Therefore, redesign is expensive and time consuming.

Microservices architectures are considered to be superior because they allow for many independent pieces of business logic to be completely decoupled, meaning that new business logic/features can be added to an existing system without the need to replace other already-operational business logic.

Moving to microservices requires:
- eliciting the accumulated dependencies within the monolithic systems;
- separating core functionalities into micro-services; and
- creating event-driven communication systems.

Current processes for creating microservices from monolithic architectures are manual with much human intervention and decision making. Consequently, they are time-consuming, costly and error prone.

In addition, the implementation of microservices introduces several challenges, for example, the complexity that was once bundled tightly into the monolith is now essentially distributed across various services with intricate inter-service messaging demands. A further challenge is that, whereas in the monolith all of the data is typically stored in one large database, with microservices, only one service should manage any single item of data, yet clearly where complex business functions are implemented it might be necessary to engage multiple microservices in combination to deliver some higher order business feature.

US Patent publication number US2019/0108067, assigned to IBM, discloses a method for transforming a monolithic application into microservices. The IBM method involves significant end-user interaction via a console to inform decisions, and completely overlooks runtime/dynamic data collection and analysis. In addition reducing noise in the data is a large problem, especially where there are large volumes of code (either executing or static), which the IBM publication does not address.

Therefore, it is difficult to structure the data on a per-service exclusivity basis and it is computationally inefficient in terms of accessing the data for higher order functions. There are also potentially increased challenges in terms of validation and deployment of microservices when compared with monolithic architectures.

SUMMARY

In accordance with a first aspect of the invention there is provided, as set out in the appended claims, a system for creating a software application which operates to perform a function, the system comprising:
- an analysis module for analyzing a version of the software application in a monolithic software system in which the software function is operational;
- an extraction module comprising dynamic analysis and static analysis of code and non-code-related artefacts for extracting discrete functional elements from the monolithic software system;
- an assembly module for forming the extracted discrete functional element into a microservice wherein the software function is recreated from one or more of said microservices.

The invention provides an assembly module for forming the extracted discrete functional element into a microservice wherein the software function is recreated from one or more of said microservices. Dynamic analysis involves attaching to programs as they execute and analysing the various interactions between program components, including analysis of data layer concerns which can includes database call. Static analysis involves analysing source code when a program is not running and can be used to establish theoretical relationships and constrains that exist in the code, such as may not be readily identified through dynamic analysis alone. Non-code-related artefacts includes data from supporting systems and sources, including source code repository analysis which can provide various temporal and meta information such as rate of change in artefacts and change origin(s)/originator(s) as well a change size.

In one embodiment the extraction module comprises a parallelized AI module for service identification configured with at least one unsupervised machine learning technique for extracting service candidates from extracted discrete functional elements wherein candidate microservices are recreated from one or more of said service candidates.

In one embodiment, the analysis module determines which data components of the monolithic software system are suitable for extraction.

In one embodiment, the analysis module analyses business logic of the monolithic software system.

In one embodiment, the analysis module uses static code analysis focused on architectural representation.

In one embodiment, the static code analysis comprises automated examination of efferent and/or afferent coupling metrics.

In one embodiment, the static code analysis comprises instability index determination.

In one embodiment, the analysis module uses dynamic code analysis under typical payloads to understand where code is more frequently executed.

In one embodiment, the analysis module uses dynamic code analysis to inform resources quotas in the microservices implementation.

In one embodiment, the analysis module uses testing asset leverage.

In one embodiment, testing asset leverage comprises pre-existing test assets targeted for transformation In one embodiment, the analysis module uses code volatility analysis.

In one embodiment, the analysis module uses AI techniques to discover which mechanisms are the best candidates for extraction to form microservices (or individual functions, which can be considered to be very small microservices as utilised in Function as a Service environments).

In one embodiment, the AI technique is Support Vector Machines.

In one embodiment, the AI technique uses neural networks.

In one embodiment, the AI technique is statistical cluster analysis (including dimensionality reduction techniques).

In one embodiment, the analysis module uses code analysis to determine information exchange within the monolith.

In one embodiment, the code analysis forms a footprint for event/messaging.

In one embodiment, code analysis examines parameter lists for methods and functions, and/or control flow and/or interaction between methods In one embodiment, the analysis module uses interface communications analysis to determine what traffic arises in interfaces within the monolith In one embodiment, the analysis module uses interface communications analysis to determine what traffic arises between the monolith and the database.

In one embodiment, the analysis module uses interface communications analysis to determine what traffic arises between the monolith and the UI.

In one embodiment, the analysis module uses automated monolith unit test case discovery in order to isolate units of interest that can be considered candidates for microservice transformation In one embodiment, the automated monolith UI test case discovery is a means to form test data for verification of the auto-generated microservices infrastructure (this includes Function as a Service).

In one embodiment, the analysis module examines object oriented (OO) structures of monolithic architectures.

In one embodiment, the analysis module examines continuous integration monolith based technology to auto-generate robust validation routines for the destination microservices based infrastructure.

In one embodiment, the analysis module uses automated analysis of source code commit logs to determine the level of volatility in each area of the code base as a means to identifying prime candidates for full microservice (or Function as a Service) implementation.

In one example, where analysis has determined the existence of large and stable features implemented in the monolithic system, the features are such instances in a form of microservice.

In accordance with a second aspect of the invention there is provided a method for creating a software application which operates to perform a function, the method comprising the steps of:

analyzing a version of the software application in a monolithic software system in which the software function is operational;

extracting discrete functional elements using dynamic and static analysis of code and non-code-related artefacts from the monolithic software system;

forming the extracted discrete functional element into a microservice; and recreating the software function from one or more of said microservices (or finer grained functions in the form of a Function as a Service target environment).

In one embodiment, the step of analyzing the monolithic software system comprises determining which data components of the monolithic software system are suitable for extraction.

In one embodiment, the step of analyzing the monolithic software system comprises analyzing business logic of the monolithic software system.

In one embodiment, the step of analyzing the monolithic software system comprises, static code analysis focused on architectural representation.

In one embodiment, the static code analysis comprises automated examination of efferent and/or afferent coupling metrics.

In one embodiment, the static code analysis comprises instability index determination.

In one embodiment, the step of analyzing the monolithic software system comprises dynamic code analysis under typical payloads (or system testing payloads) to understand execution paths and dependencies, and where code is more frequently executed.

In one embodiment, the step of analyzing the monolithic software system comprises dynamic code analysis to inform resources quotas in the microservices implementation.

In one embodiment, the step of analyzing the monolithic software system comprises, testing asset leverage.

In one embodiment, testing asset leverage comprises a pre-existing test assets targeted for transformation.

In one embodiment, the step of analyzing the monolithic software system comprises code volatility analysis.

In one embodiment, the step of analyzing the monolithic software system comprises using AI techniques to discover which mechanisms are the best candidates for extraction to form microservices.

In one embodiment, the AI technique is Support Vector Machines.

In one embodiment, the AI technique uses neural networks.

In one embodiment, the AI technique is statistical cluster analysis.

In one embodiment, the step of analyzing the monolithic software system comprises code analysis to determine information exchange within the monolith.

In one embodiment, the code analysis forms a footprint for event/messaging.

In one embodiment, code analysis examines parameter lists for methods and functions, and/or control flow and/or interaction between methods In one embodiment, the step of analyzing the monolithic software system comprises interface communications analysis determine what traffic arises in interfaces within the monolith In one embodiment, the step of analyzing the monolithic software system comprises interface communications analysis determine what traffic arises between the monolith and the database.

In one embodiment, the step of analyzing the monolithic software system comprises interface communications analysis determine what traffic arises between the monolith and the UI.

In one embodiment, the step of analyzing the monolithic software system comprises automated monolith unit test case discovery in order to isolate units of interest that can be considered candidates for microservice transformation In one embodiment, the automated monolith UI test case discovery is a means to form test data for verification of the auto-generated microservices infrastructure.

In one embodiment, the step of analyzing the monolithic software system comprises examining object oriented (OO) structures of monolithic architectures.

In one embodiment, the step of analyzing the monolithic software system comprises examining continuous integration monolith based technology to auto-generate robust validation routines for the destination microservices based infrastructure.

In one embodiment, the step of analyzing the monolithic software system comprises automated analysis of source code commit logs to determine the level of volatility in each area of the code base as a means to identifying prime candidates for full microservice implementation.

In one example, where analysis has determined the existence of large and stable features implemented in the monolithic system, the features are such instances in a form of microservice.

In accordance with a third aspect of the invention there is provided a computer program having program instructions for operating the method of the second aspect of the invention.

BRIEF DESCRIPTION OF THE DRAWINGS

The invention will be more clearly understood from the following description of an embodiment thereof, given by way of example only, with reference to the accompanying drawings, in which:—

FIG. 4 illustrates a detailed architecture of a fully automated system for creating a software application which operates to perform a software function.

DETAILED DESCRIPTION OF THE DRAWINGS

The present invention provides a system and method for automation of the creation of a software application as a combination of microservices by extraction of discrete elements of software functionality from a monolithic architecture, forming them into microservices such that the software application is recreated as serverless hardware infrastructure while also validating the transformed code. In many cases, serverless microservices will significantly reduce the hardware requirement for software systems.

Figure 1:
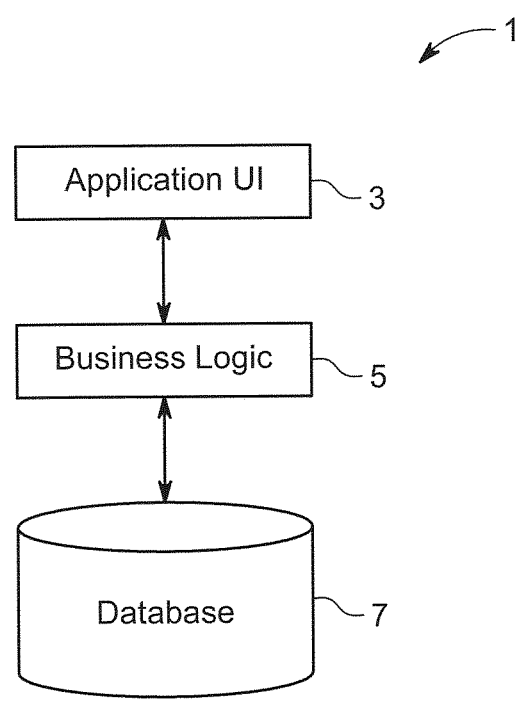
FIG. 1 is a schematic representation of a monolithic architecture.
Figure 2:
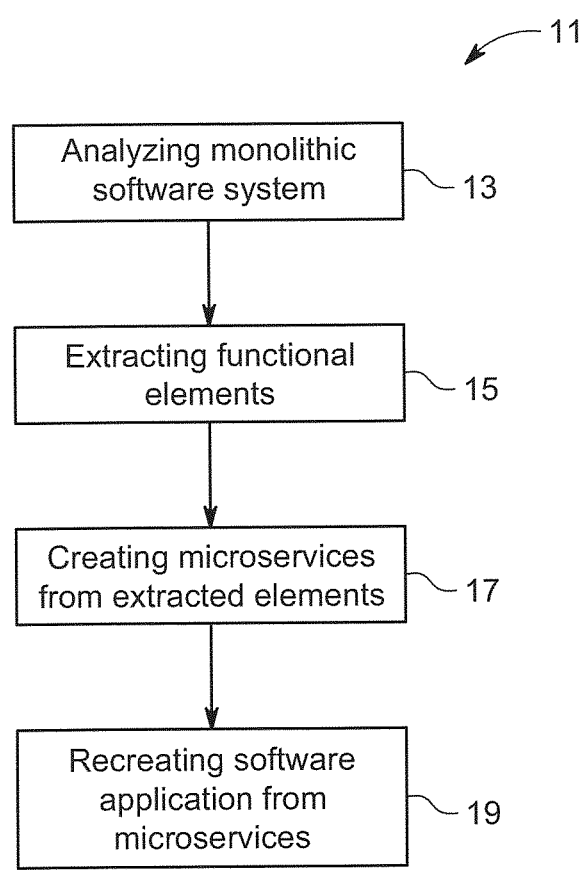
FIG. 2 is a flow diagram which illustrates an example of the method of the present invention.

FIG. 2 shows an example of a method 11 for creating a software application which operates to perform a software function. The method analyses 13 a tightly bound monolithic software system in which the software function is operational. Examples of the means of analysis are provided below. The functional elements are extracted 15 from the monolithic software system and then formed 17 into a microservice. In this example, a number of microservices are created and used to recreate 19 the software function.

Figure 3:
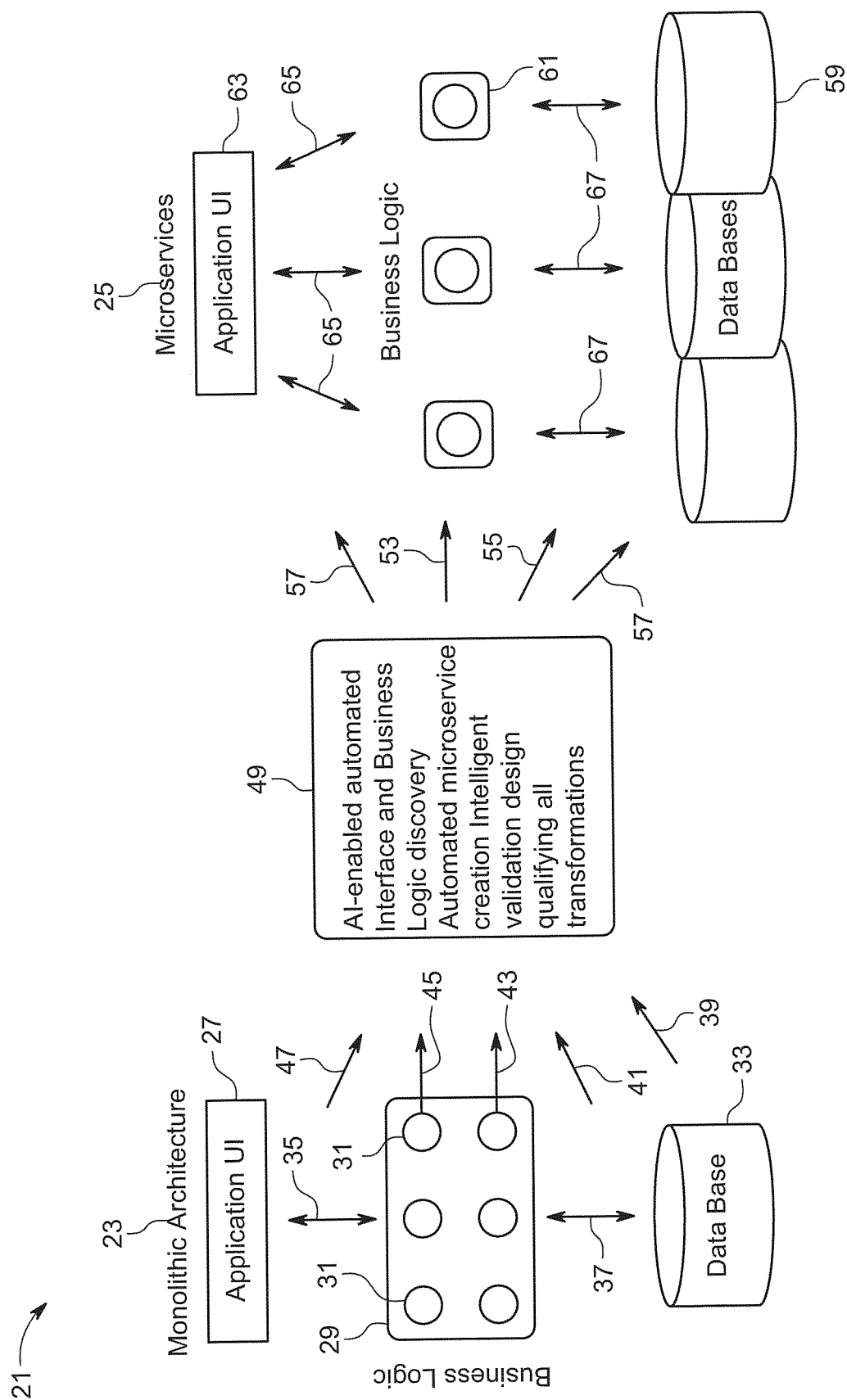
FIG. 3 is a schematic representation of an example of a system in accordance with the present invention.

The use of the method of the present invention is also described with reference to FIG. 3 below which shows the system, referred to as the microservice engine 49. FIG. 3 is a schematic representation 21 which shows a known monolithic architecture for a software application 23, a software application created using microservices 25 and a microservice engine 49 in accordance with the present invention.

The monolithic architecture 23 comprises an application user interface (UI) 27, tightly bound business logic module 29 with business logic elements 31 and a database 33. I/O communication 35 between the application UI 27 and the business logic module 29 and I/O communication 37 between the database 33 and the business logic module 29 are shown.

The microservice engine comprises a bundle of software analysis tools described in more detail below which analyse the tightly bound monolithic software system 23. It also extracts elements from the monolithic software system and then forms them into one or more microservice to recreate the software function as a loosely bound set of microservices.

Analysis of the monolithic architecture includes analysis of:
  I/O communication 35 between the application UI 27 and the business logic module 29;
  I/O communication 37 between the database 33 and the business logic module 29;
  business logic elements 31;
  Interaction between business logic elements; and
  the database.

Once the analysis has been completed, the microservice engine assembles the extracted elements into one or more microservices (or smaller functions such as may be used in a Function as a Service environment) which recreates the software function of the software of the monolithic architecture. This is achieved as a series of outputs 51, 53, 55, 57 which define various microstructures as loosely bound business logic elements, loosely bound database elements 59, I/O communication 65 between the application UI 63 and the business logic elements 61 and I/O communication 67 between the database elements 59 and the business logic elements 61.

In order to achieve this, a variety of analysis tools are used to analyse different features and functions of the monolithic software application.

The architecture is analysed using static code analysis. Dynamic code analysis under typical payloads (or system test payloads) is used to understand code hot spots (parts that are executing more often) and also to inform resources quotas in the microservices implementation. Resource quotas are concerned with the allocation of hardware resources to microservices, for example determining or allowing for a certain capacity of CPU and RAM to be allocated to a microservice. Dynamic analysis involves attaching to programs as they execute and analysing the various interactions between program components, including analysis of data layer concerns which can includes database call. Static analysis involves analysing source code when a program is not running and can be used to establish theoretical relationships and constrains that exist in the code, such as may not be readily identified through dynamic analysis alone. Non-code-related artefacts includes data from supporting systems and sources, including source code repository analysis which can provide various temporal and meta information such as rate of change in artefacts and change origin(s)/originator(s) as well a change size.

The interface communications 31 between the application UI 27 and the business logic 29 and between communications 37 between the database 33 and the business logic 29 are analysed to determine what traffic arises in interfaces within the monolith.

Advanced code analysis is used to determine information exchange within the monolithic system 23 so as to form a footprint for event/messaging. For example, a very basic form of this analysis would examine parameter lists for methods and functions, as well as control flow and interaction between methods.

Static analysis is used to enable automated examination of general coupling and other object-oriented infrastructure (e.g. efferent and afferent coupling metrics) along with instability index determination. Automated unit test case and test case suite discovery are created for the monolithic software to isolate units of interest that can be considered candidates for microservice transformation.

Automated monolith test case discovery is used with the application UI 27 as a means to form test data for verification of the auto-generated microservices infrastructure. For example, test cases developed using technology such as Selenium could be discovered and ported to the microservices based implementation.

In addition, the object oriented (OO) structures of monolithic architectures is examined. The structure of an OO implementation can be highly informative in relation to service (and microservice) discovery. DevOps based development and deployment chains may be created automatically.

Examples of the present invention may also use interface communications discovery to determine exactly what traffic arises in interfaces between the monolithic software 29 and the UI 27. Similarly, interface communications discovery is used to determine exactly what traffic arises in interfaces between the monolithic software 29 and the database 33.

The present invention provides:
- a software-based system that will automatically determine a monolithic architecture through the implementation of AI techniques;
- a software-based system that will enable the creation of a microservices based infrastructure;
- a software-based system that will enable the establishment of appropriate event/messaging infrastructure; and
- a software-based system that will enable access to a serverless deployment environment.

In operation, FIG. 4 illustrates a detailed architecture of a fully automated system similar to FIG. 3 for creating a software application which operates to perform a software function, according to one embodiment of the invention. A number of separate phases are required in order for the system and method to operate. In a first phase the analysis module 100 is configured with a dynamic data collection engine 101 for analysing the dynamic behaviour at runtime of a version of the software application in a monolithic software system in which the software function is operational. The first phase can also include static data collection engine 102 configured for analysing the static behaviour of a version of the software application in a monolithic software system in which the software function is operational. A repository collection engine 103 is configured for profiling source code repositories and commit history cluster analysis of the software application in a monolithic software system. A dynamic data preparation engine 104 is provided and comprises a semantic domain analysis module for extracting domain entities of the software application in which the software functions are built around the entities. A multi-form filtering engine is configured for extracting and filtering the runtime interaction of the monolith code using sophisticated pruning heuristics and automated fitness sensitization using packages, classes, methods, URLs and database Queries of the software application in a monolithic software system in which the software function is operational.

An extraction module 105 comprises a parallelized AI module for service identification using unsupervised machine learning techniques (for example agglomerative clustering, spectral clustering and/or FP tree analysis) for extracting service candidates wherein candidate microservices are recreated from one or more of said service candidates.

An assembly module 106 comprises a Multivariate Service Optimisation and Selection module using Constraint-based Optimisation Algorithmic Techniques and configured to identify desirable microservice features including inter and intra, structural and semantic similarities within and among candidate microservices. If the microservice is not deemed optimal the result can be fed back into the parallelized AI module for further processing.

In one embodiment the dynamic data collection engine 101 is configured to collect runtime data from the monolithic application and extracts the execution traces of the software with information including chains, URLs, classes, methods and database methods to construct a call graph. The static data collection engine 102 collects static data from the monolithic application, extracts the execution traces of the software with information including chains, URLs, classes, methods and database methods, analyse the control flow and the data flow. The repository collection engine 103 is configured to profile the source code repository of the monolithic application and clusters the application components based on the commit history of the monolithic application. A commit history cluster analysis module clusters the monolith code into clusters with similar behaviour.

In the analysis module the dynamic data preparation engine 104 performs semantic domain analysis to automatically extract domain-specific entities of the monolithic application using the output of the parallelized AI Module. The dynamic data preparation engine performs a multi-form filtering engine that can utilise sophisticated pruning heuristics and automated fitness sensitizing using Packages, classes, Methods, URIs, Database Methods.

In one embodiment the parallelized AI module automatically and concurrently extracts initial service candidates using unsupervised machine learning techniques including agglomerative clustering, spectral clustering and FP tree analysis. The parallelized AI module also composes candidate microservices from initial service candidates using constraint-based optimisation techniques.

In the assembly module 106, the multivariate service optimisation and selection using constraint-based optimisation algorithm uses fitness functions generated based on the outputs provided from the analysis module and the extraction module to select the service composition deemed optimal. The module 106 can be configured to use optimisation techniques to compose optimal service candidates that demonstrate the desirable microservice feature, wherein the selected service candidates become the recommended microservices.

As used herein, the term software application means a software function implemented in a given architecture/platform. Software function refers to the functionality of the software regardless of the architecture/platform.

The description of the invention including that which describes examples of the invention with reference to the drawings may comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a memory stick or hard disk. The carrier may be an electrical or optical signal which may be transmitted via an electrical or an optical cable or by radio or other means.

The invention is not limited to the embodiments hereinbefore described but may be varied in both construction and detail.

What is claimed is:

1. A system for creating a software application which operates to perform a software function, the system comprising:
   an analysis module for analyzing a version of the software application in a monolithic software system in which the software function is operational,
      wherein the analysis module comprises code analysis including dynamic code analysis of code and static code analysis of the code and non-code-related artefacts for extracting discrete functional elements from the monolithic software system,
      wherein the dynamic code analysis is performed to analyze dynamic behavior at runtime of the version of the software application, and
      wherein the dynamic code analysis is performed under system test payloads to understand hot spots, execution paths and dependencies in the code;
   an extraction module comprising a parallelized Artificial Intelligence (AI) module for service identification using unsupervised machine learning techniques for extracting initial service candidates from the discrete functional elements, and composing candidate microservices from the initial service candidates; and
   an assembly module for
      identifying one or more microservice features among the candidate microservices,
      processing fitness function for the candidate microservices that demonstrate the identified one or more microservice features,
      composing recommended microservices that demonstrate the identified one or more microservice features, and
      forming each discrete functional element of the discrete functional elements that extracted into a microservice to form microservices, wherein the software function is recreated from one or more of the microservices that are formed.

2. The system of claim 1 wherein, the analysis module determines which data components of the monolithic software system are suitable for extraction.

3. The system of claim 1 wherein, the analysis module analyzes business logic of the monolithic software system.

4. The system of claim 1 wherein, the analysis module uses the static code analysis focused on architectural representation.

5. The system of claim 1 wherein, the analysis module uses the dynamic code analysis under the system test payloads to understand where the code is more frequently executed.

6. The system of claim 1 wherein, the analysis module uses the dynamic code analysis to inform resources quotas in the microservices formed.

7. The system of claim 1 wherein, the analysis module uses testing asset leverage.

8. The system of claim 7 wherein, the testing asset leverage comprises a pre-existing test assets targeted for transformation.

9. The system of claim 1 wherein, the analysis module uses code volatility analysis.

10. The system of claim 1 wherein, the analysis module uses artificial intelligence (AI) techniques to discover which mechanisms are best candidates for extraction to form said microservices.

11. The system of claim 1 wherein, the analysis module uses the code analysis to determine information exchange within the monolithic software system.

12. The system as claimed in claim 11 wherein, the code analysis forms a footprint for event/messaging.

13. The system of claim 11 wherein, the code analysis examines parameter lists for methods and functions, and/or control flow and/or interaction between the methods.

14. The system of claim 1 wherein, the analysis module uses interface communications analysis to determine what traffic arises in interfaces within the monolithic software system.

15. The system of claim 1 wherein, the analysis module uses interface communications analysis to determine what traffic arises between the monolithic software system and a database.

16. The system of claim 1 wherein, the analysis module uses interface communications analysis to determine what traffic arises between the monolithic software system and a user interface (UI).

17. The system of claim 1 wherein, the analysis module uses automated monolith unit test case discovery in order to isolate units of interest that can to be considered candidates for microservice transformation.

18. The system of claim 17 wherein, the automated monolith unit test case discovery is a means to form test data for verification of an auto-generated microservices infrastructure.

19. The system of claim 1 wherein, the analysis module examines object oriented (OO) structures of monolithic architectures.

20. The system of claim 1 wherein, the analysis module examines continuous integration monolith based technology to auto-generate robust validation routines for destination microservices based infrastructure.

21. The system of claim 1 wherein, the analysis module uses automated analysis of source code commit logs to determine a level of volatility in each area of the source code as a means to identifying prime candidates for full microservice implementation.

22. The system of claim 1 wherein, where analysis has determined existence of large and stable features implemented in the monolithic software system, the large and stable features are such instances in a form of the microservice.

23. The system as claimed in claim 1, wherein the dynamic code analysis involves attaching to programs during execution, and analyzing various interactions between program components, including analysis of data layer concerns that includes database calls and data layer structure and behavior.

24. The system as claimed in claim 1, wherein the analysis module is configured with a dynamic data collection engine for analyzing the dynamic behavior at runtime version of the software application and collecting runtime data from the software application, and extracting execution traces of the software application with information including chains, Uniform Resource Locators (URLs), classes, methods and database methods to construct a call graph.

25. The system as claimed in claim 1, wherein the analysis module is provided with a dynamic data preparation engine for performing semantic domain analysis to automatically extract domain-specific entities of the software application using output of the parallelized Artificial Intelligence (AI) module.

26. A method for creating a software application which operates to perform a software function, the method comprising:
   analyzing a version of the software application in a monolithic software system in which the software function is operational,
      wherein the analyzing comprises code analysis including dynamic code analysis of code and static code analysis of the code and non-code-related artefacts for extracting discrete functional elements from the monolithic software system,
      wherein the dynamic code analysis is performed to analyze dynamic behavior at runtime of the version of the software application, and
      wherein the dynamic code analysis is performed under system test payloads to understand hot spots, execution paths and dependencies in the code;
      extracting initial service candidates from the discrete functional elements with a parallelized Artificial Intelligence (AI) module for service identification using unsupervised machine learning techniques, and composing candidate microservices from the initial service candidates;
   identifying one or more microservice features among the candidate microservices;
   processing fitness function for the candidate microservices that demonstrate the identified one or more microservice features;
   composing recommended microservices that demonstrate the identified one or more microservice features; and
   forming each discrete functional element of the discrete functional elements that are extracted into a microservice to form microservices; and recreating the software function from one or more of the microservices that are formed.

27. A non-transitory computer readable storage medium storing a computer program having program instructions for operating a method for creating a software application which operates to perform a software function, the method comprising:
   analyzing a version of the software application in a monolithic software system in which the software function is operational,
      wherein the analyzing comprises code analysis including dynamic code analysis of code and static code analysis of the code and non-code-related artefacts for extracting discrete functional elements from the monolithic software system,
      wherein the dynamic code analysis is performed to analyze dynamic behavior at runtime of the version of the software application, and
      wherein the dynamic code analysis is performed under system test payloads to understand hot spots, execution paths and dependencies in the code;
      extracting initial service candidates from the discrete functional elements with a parallelized Artificial Intelligence (AI) module for service identification using unsupervised machine learning techniques, and composing candidate microservices from the initial service candidates;
   identifying one or more microservice features among the candidate microservices,
   processing fitness function for the candidate microservices that demonstrate the identified one or more microservice features;
   composing recommended microservices that demonstrate the identified one or more microservice features;
   forming each discrete functional element of the discrete functional elements that are extracted into a microservice to form microservices; and
   recreating the software function from one or more of the microservices that are formed.

* * * * *